United States Patent [19]

DiNatale

[11] 4,167,327
[45] Sep. 11, 1979

[54] PHOTOGRAPHIC PRINTING METHOD

[76] Inventor: Robert F. DiNatale, Old Mill Rd., Sutton, Mass. 01527

[21] Appl. No.: 888,822

[22] Filed: Mar. 22, 1978

[51] Int. Cl.² .................. G03B 27/32; G03B 27/52
[52] U.S. Cl. .................................... 355/77; 355/32
[58] Field of Search .............. 96/27 E, 27 R, 23; 356/204; 355/4, 77, 88, 67, 32, 35, 36, 38, 68, 71, 37, 70

[56] References Cited

U.S. PATENT DOCUMENTS

| 3,051,069 | 8/1962 | Neale | 355/77 |
| 3,285,125 | 11/1966 | Mitchell | 96/27 E |
| 3,392,626 | 7/1968 | Miller et al. | 355/88 X |
| 3,529,522 | 9/1970 | Dunn | 355/68 X |
| 3,552,288 | 1/1971 | Corley | 96/27 E |
| 3,601,485 | 8/1971 | Barbieri et al. | 355/77 X |
| 3,672,766 | 6/1972 | Levy | 355/32 |
| 3,685,900 | 8/1972 | Kirby et al. | 355/35 X |
| 3,718,074 | 2/1973 | Davis | 355/77 X |
| 3,718,397 | 2/1973 | Smajo | 355/88 |
| 3,807,857 | 4/1974 | Rubin | 355/71 X |
| 3,887,333 | 6/1975 | Mimura | 356/204 X |
| 3,967,897 | 7/1976 | Rogers | 355/32 |
| 4,087,180 | 5/1978 | DiNatale | 355/77 |

Primary Examiner—Donald A. Griffin
Attorney, Agent, or Firm—Joseph S. Iandiorio

[57] ABSTRACT

A method of photographic printing including making a stepped exposure of a simulation of a properly exposed gray card for a film to be printed having particular D/log E characteristics, and the film-mask-colored element for film having a colored mask, for a number of different periods of time on at least one sheet of photographic paper having certain D/log E characteristics; processing each sheet of paper; comparing each such exposure step of a simulation of a properly exposed gray card to a gray reference to determine the proper exposure time from the step most closely approaching the gray reference; and measuring the intensity of the exposing light to obtain the proper intensity which, with the proper time, determines the exposure to be used to print all film having D/log E characteristics generally similar to the particular D/log E characteristics on paper having D/log E characteristics generally similar to the certain D/log E characteristics.

8 Claims, 11 Drawing Figures

EXPOSURE INTENSITY

PHOTOGRAPHIC PRINTING METHOD

FIELD OF INVENTION

This invention relates to a method of photographic printing and more particularly to an improved method for determining one proper exposure time and intensity independently of determining one color filter combination which provides faithful reproduction of all frames on all films of a particular class, when printed on any photographic paper having a specific response.

BACKGROUND OF INVENTION

Traditionally, one or more test prints must be made and evaluated to determine the proper exposure time and intensity and color filtration required to properly expose and color balance a print of an image on particular positive or negative film. Recently, with the introduction of color filter calculator devices such as, for example, the Subtractive Calculator Kit by Beseler and the Mitchell Duocube by Unicolor, the determination of exposure time and color filtration has allegedly been simplified. Typically with such devices one must make a test print through the calculator using light transmitted through the frame to be printed and a diffuser. After processing the print, the calculator pattern of a multitude of dots or areas is compared against a standard gray card or other reference to determine the proper color filtration. The exposure time may be determined by the spot, dot or area which fixes the color filtration or by an area or dot or spot in another pattern of areas produced through the calculator. If the calculator print produces no acceptable time or filtration, a second such print with other filter and/or time parameters may be required. Nevertheless, even if the first calculator test print is sufficient to give time and filtration, those parameters suffice only for the frame of that film on that paper. If another frame is to be printed, the whole process is repeated. In some cases, however, it is suggested that if a properly exposed frame with good color balance is included in the roll of film with which you are printing, the color filtration and exposure time obtained for that frame may be used as at least a starting point for the other frames. Thus even with these color calculator devices, there is still required a great deal of experimentation from frame to frame regarding color balance and exposure time and intensity.

Producers of film and paper usually suggest a color filtration but this can not be relied on as an optimum because of the variations in each individual's enlarger light, lens, age of the lamp, voltage levels, film, and paper age at processing and other variables.

More recently there has been proposed a photographic printing method for determining one proper exposure time and intensity and one proper filter combination for all frames of a film and all films of a particular class on any photographic paper having a specific response, which is the subject of applicant's co-pending U.S. patent application Ser. No. 763,326, filed Jan. 28, 1977, now U.S. Pat. No. 4,087,180, hereby incorporated herein by reference.

SUMMARY OF INVENTION

It is an object of this invention to provide an improved and extremely simple method of photographic printing.

It is a further object of this invention to provide a method of determining one proper exposure time and intensity independently of and preliminary to determining one proper color filter combination for all frames of a film, and all films of a particular class printed on any photographic paper having a specific response.

It is a further object of this invention to provide such a method for more accurately determining the exposure time.

The invention results from the realization that the exposure time and intensity required to faithfully reproduce a simulation of a gray card for a particular class of film on a photographic paper a specific response is the one proper exposure time and intensity which faithfully reproduces all frames of all films of that class when printed on any paper having that specific response.

The invention features a method of photographic printing including making a stepped exposure of a simulation of a properly exposed gray card on a film to be printed having particular D/log E characteristics, and a film-mask-colored element for a film having a color mask, for a number of different periods of time on at least one sheet of photographic paper having certain D/log E characteristics. Each sheet of paper is then processed, and a comparison is made of each such exposure step of the simulation of the properly exposed gray card to a gray reference to determine the proper exposure time from the step most closely approaching the gray reference. The intensity of the exposing light is measured to obtain the proper intensity, with which the proper time determines the exposure to be used to print all films having D/log E characteristics generally similar to the particular D/log E characteristics on paper having D/log E characteristics generally similar to the certain D/log E characteristics.

An additional exposure is made of a simulation of a properly exposed neutral gray card for the film to be printed having the particular D/log E characteristics and a film-mask-color element for film having a color mask for the proper time at the proper intensity on at least one sheet of photographic paper having the certain D/log E characteristics. Each sheet of paper is processed and then the additional exposure of the simulation of a gray card is compared to a gray reference to determine the color filtration to be used to print all films having D/log E characteristics generally similar to the particular D/log E characteristics on paper having D/log E characteristics generally similar to the certain D/log E characteristics. In determining the proper exposure time, the gray reference is preferably a midtone gray, and in determining the proper color filtration, the gray reference is preferably a neutral gray as well.

In the comparison of the exposure steps, there may be imposed on the gray reference and the exposure steps filtration similar in color to any color cast of the exposure steps to minimize the color difference between the gray reference and the exposure steps during comparison.

In order to determine the approximate color filtration to be used in the additional exposure, the comparison step may include imposing on the exposure steps filtration complementary in color to any color cast of the exposure steps in order to neutralize that color difference between the exposure steps and the gray reference. This aids in obtaining a starting filter pack closer to the proper one and makes it more likely that the proper filter pack will be found with but one additional exposure. Preferably, the additional exposure is made through a color filter calculator device which produces a plurality of shades of gray and shades of colors to facilitate finding the optimum color filter pack.

When the film to be printed is a positive film, the simulation of a properly exposed gray card may be an image of a gray card photographed onto the positive film; or it may be from a 0.7 to 1.2 neutral density filter. Since all positive films must be color balanced to faithfully reproduce naturally occurring scenes, they all are considered as having generally similar D/log E characteristics; that is, the D/log E characteristic for each of the color dyes in the film emulsion are approximately coincidental for the significant portion of their extent. Thus, exposure time and intensity and color filter combination determined as proper for a particular positive film to obtain a faithful reproduction of a gray card on photographic paper having a specific color response, i.e. certain D/log E characteristics, will be valid for all other positive films. However, if a photographic paper having a different emulsion, i.e. different D/log E characteristics, is used, adjustment must be made to accommodate for the differences between the two different papers or a new exposure of a simulation of a properly exposed gray card must be made on the new paper to determine a new color pack and exposure time and intensity.

If the simulation of a properly exposed gray card is a neutral density filter, then the particular color personality for which the film is known will be maintained: Ektachrome will maintain its sharp blues and slight bluish cast; Kodachrome its slight reddish cast; Fujichrome its slight greenish cast. However, if the simulation of a properly exposed gray card is provided by an image of the gray card on a particular film, the color personality of that particular film will be compensated for and eliminated.

If the film to be printed is a negative film, the simulation of a properly exposed gray card may be an image of a gray card on the negative film, in combination with an element having the same color as the mask of the negative film. An addition of this element is not necessary when an image of a gray card is used, because the negative intrinsically contains its own mask coloration, which will then be compensated for in determining the color filter. In positive film, no such color mask is needed, since there is no color mask in positive film: the film is essentially clear. D/log E characteristics are not the same for all negative films. Thus the exposure time and color pack determined for a particular negative film and a certain color paper may be used for all the frames on that negative film so long as it is printed on that color paper, but may only be used for other negative films insofar as they are produced with the same emulsion.

The method accommodates black and white film as well as color film, and may be effectively used to make contact prints by simply using the techniques heretofore recited with the frame or frames in close proximity or contacting the photographic printing paper.

DISCLOSURE OF PREFERRED EMBODIMENT

Other objects, features and advantages will occur from the following description of a preferred embodiment and the accompanying drawings, in which.

Figure 2:
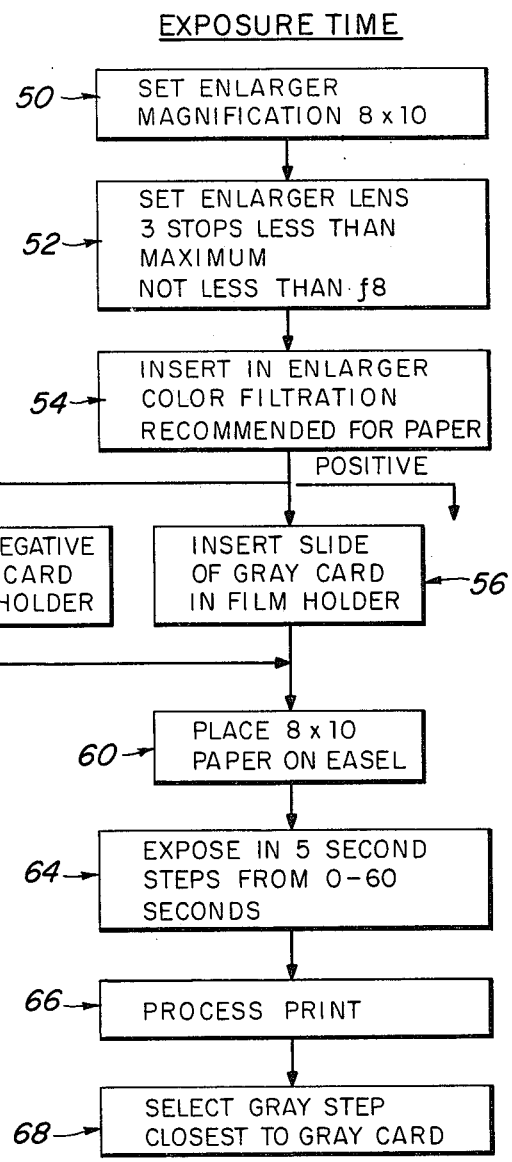
FIG. 2 is a flow chart showing the steps for obtaining the proper exposure time according to this invention.
Figure 8:
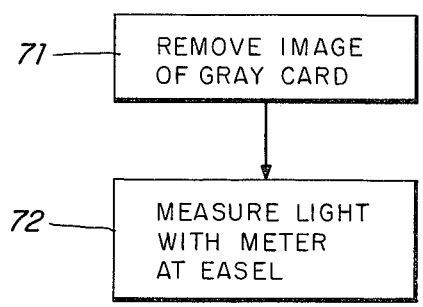
FIG. 8 is a flow chart showing steps in determining the intensity of light required to produce a print using the exposure time determined by performing the sequence of steps shown in FIG. 2.
Figures 9, 10:
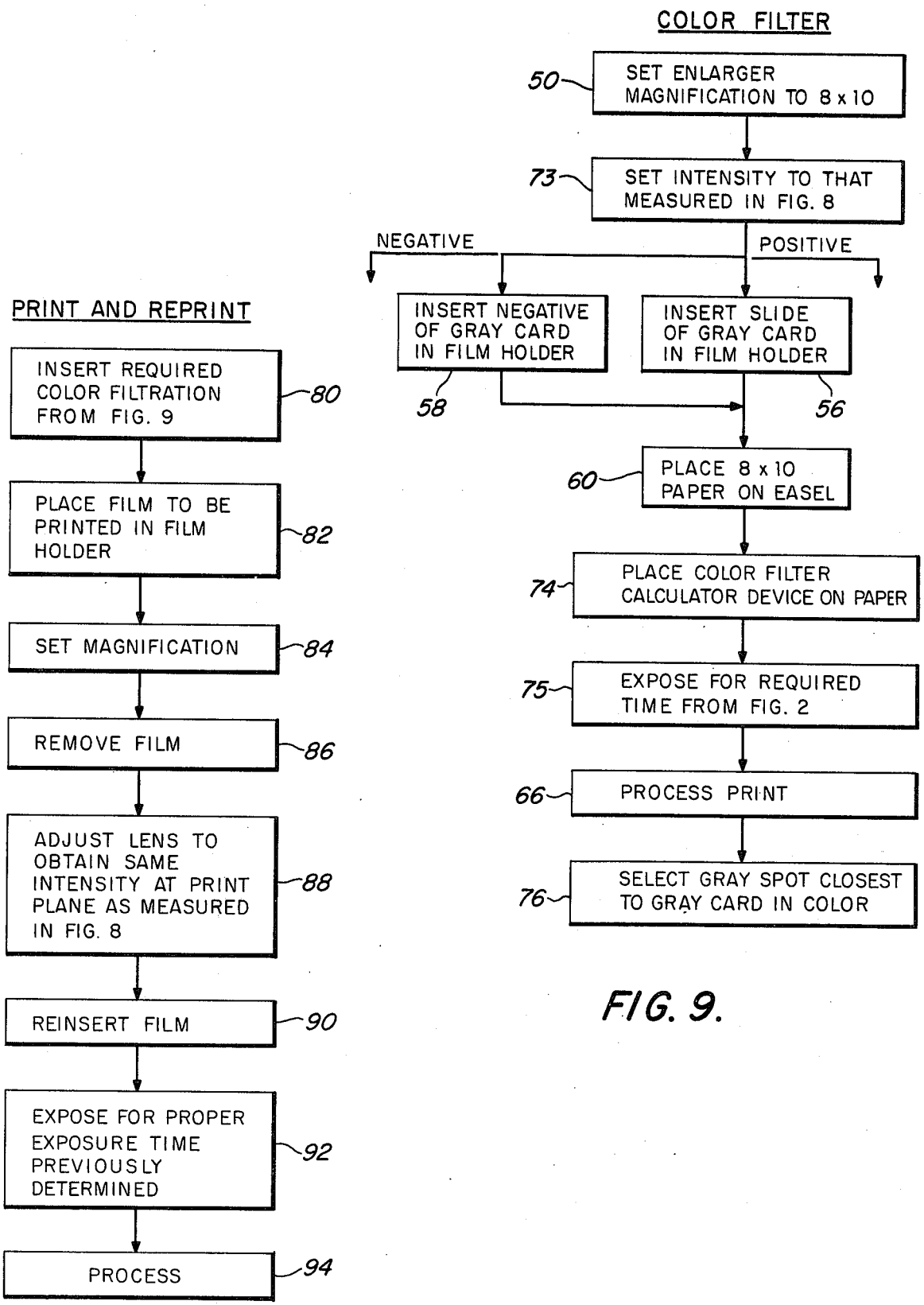

FIG. 9 is a flow chart showing the steps for determining the color filtration required to produce a print using the time and intensity determined in FIGS. 2 and 8; and FIG. 10 is a flow chart showing the steps according to this invention for printing an image using the color filtration determined from FIG. 9, the exposure time determined by the sequence of steps in FIG. 2 and the light intensity determined from the steps in FIG. 8.

The invention may be accomplished with a method of photographic printing for use with a light source, a print plane, a film holder positioned between the print plane and light source, and stop setting means and image producing means between the holder and the print plane. First, there is inserted between the light source and print plane the simulation of a properly exposed neutral gray card for a film to be printed which has particular D/log E characteristics and a film-mask-colored element for film having a colored mask. There is then made a stepped exposure of the simulation of a properly exposed gray card for a number of periods of time on at least one sheet of photographic paper having certain D/log E characteristics. Each step of the simulation of the properly exposed gray card is compared to a gray card to determine the proper exposure time required to faithfully reproduce the simulation of a properly exposed gray card on photographic paper having the certain D/log E characteristics. Preferably the simulation is a slide or negative made by photographing an 18% neutral gray card and the gray reference is the same card or one similar to it or an electronic or optical reference.

In determining the proper exposure time the steps are often combined with a color cast: they are not neutral gray. In order to prevent this cast from interfering with the determination of the step closest to midtone or 18% gray, a color filter of similar hue may be imposed on the steps and gray reference in order to minimize the difference in color between the steps and the gray reference. In order to determine the intensity of the light required to make the proper exposure, a simulation of a properly exposed gray card, and the film-mask-colored element, for film having a colored mask, is removed, and the intensity of the light incident at the print plane is measured and recorded. Alternatively, the proper intensity can be measured with the gray card in place and that reading used as the proper intensity.

To obtain the proper color filtration, the intensity of the enlarger light source is set to that previously measured. The simulation of a properly exposed neutral gray card is inserted in the film holder and a piece of photographic paper is placed on the easel. There is then made an exposure of a simulation of the properly exposed neutral gray card for the period of time previously determined, on a sheet of photographic paper having certain D/log E characteristics. The exposure of the simulation of the properly exposed neutral gray card is compared to a gray card, using color filters, such as in a color filter calculator, where necessary, to determine the proper color filtration required to faithfully reproduce the simulation of a properly exposed gray card on photographic paper having those certain D/log E characteristics.

Assuming properly exposed images on film, prints of such images on any film having D/log E characteristics generally similar to the particular D/log E characteristics for which the exposure time and color pack were determined may be made on any paper having D/log E characteristics generally similar to the certain D/log E characteristics of the paper for which the exposure time and color pack were determined, by inserting in the film holder such film containing an image to be printed and then setting the distance between the film and the print plane to obtain the desired magnification. After removing the film from the enlarger film holder, the stop setting means is adjusted to obtain the same light intensity at the print plane as previously measured. The film pack is returned to the enlarger film holder and an additional sheet of photographic paper having D/log E characteristics similar to the certain D/log E characteristics of the original paper is exposed at the print plane using the same color filtration and the same exposure time. This additional sheet of paper is processed to obtain a print of the image on the film.

Contact prints may be made by using the same color filter pack and exposure time and intensity as previously discussed and setting the magnification and stop as explained supra, and then exposing an additional sheet of photographic paper having D/log E characteristics generally similar to the certain D/log E characteristics of the original paper with the film at the print plane on top of the paper.

The simulation of a properly exposed neutral gray card for either positive or negative film may be either a frame of that film containing an image on a gray card properly exposed or may be a neutral density filter in conjunction with any mask-colored-element necessary for film which has a colored mask. Typically, positive films are essentially clear and have no color mask, while negative films typically do have a color mask and will require some mask-colored-element to compensate.

In preferred embodiments, a starting color pack may be used by inserting in the color head of the enlarger the initial color filtration recommended by the manufacturer for that particular emulsion batch of paper. Further, the initial exposures of the simulation of a properly exposed neutral gray card may be made through a color filter calculator device which, through its capability for making a number of dots, spots, or areas, each of different filtration and/or exposure characteristics, substantially lessens the number of test prints that have to be made and in fact, if properly done, only one test print may be needed.

In order to obtain a starting color pack even closer to the proper pack before the additional exposure is made, the steps may have imposed on them filtration complementary in color to any color cast of the steps to the extent necessary to make the steps appear most nearly neutral. This also helps ensure that the gray spot will occur within the range of the color calculator device when one is used.

Figure 1:
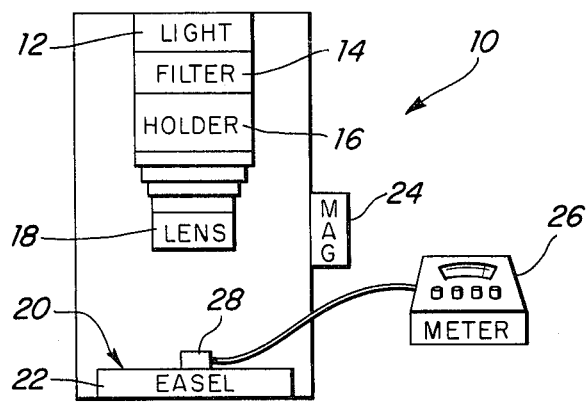
FIG. 1 is a diagrammatic view of a conventional enlarger meter which may be used to perform the method of this invention.

There is shown in FIG. 1 an enlarger 10 having a light source 12, color filter chamber 14, film holder 16, and lens 18, which incorporates both image-producing means and stop means. Print plane 20 for containing photographic paper to be printed is provided by easel 22 and a magnification control 24 sets the size of the image at easel 22. Any convenient meter 26 may be used; preferably it has a cell 28 that enables it to read and to determine light intensity in a very small area.

In accordance with one technique for carrying out the method of this invention, the enlarger FIG. 1, first has its magnification set, step 50, FIG. 2, to some medium range magnification, typically $8 \times 10$ inches. Next, enlarger lens 18 is set, step 52, to three stops less than the maximum provided for in the lens but at any rate typically not less than f8. Following this, in step 54, the color filtration recommended for the photographic paper to be used may, but need not, be inserted in the enlarger.

Figure 3:
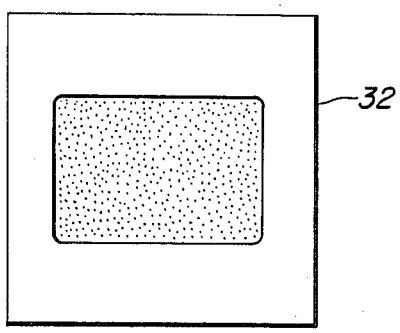
FIG. 3 depicts an image on positive film of a neutral density gray card mounted in a slide.
Figure 5:
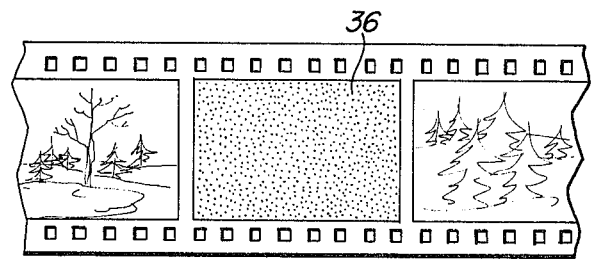
FIG. 5 depicts a portion of a negative film showing a frame containing an image of a neutral density gray card.
Figure 4:
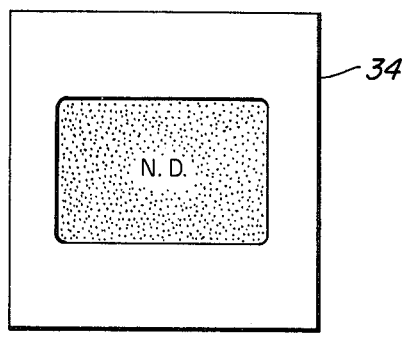
FIG. 4 depicts a neutral density filter mounted in a slide.
Figure 6:
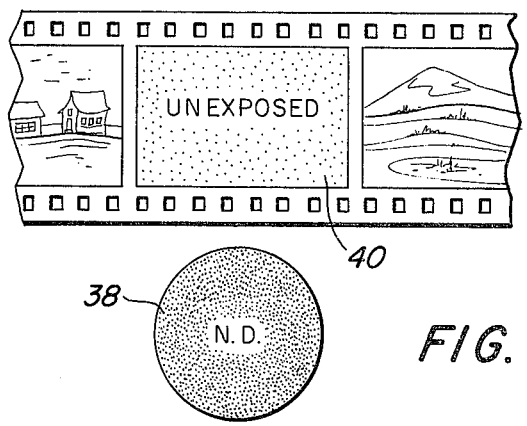
FIG. 6 depicts a neutral density filter and a portion of a negative film containing an unexposed, developed frame.

At this point, if the film to be printed is positive film, either a 0.7–1.2 neutral density filter 34, FIG. 4, or positive film frame of a gray card 32, FIG. 3, is put in the film holder 16, step 56. If the film is a negative film, then either the negative of the gray card 36, FIG. 5, or a 0.7–1.2 neutral density filter 38, FIG. 6, with an unexposed frame of film 40 or equivalent mask-colored element is inserted in the film holder, step 58. Following this, an $8 \times 10$ sheet of photographic paper is placed on easel 22.

A stepped exposure, step 64, is now made for different periods of time, e.g. a series of twelve steps in five-second increments from 0 to 60 seconds is made. For films of lower slope such as negative film, intervals of three seconds are preferred.

Subsequently, the print is processed, step 66, and the strip or area closest to a gray card in exposure density is selected, step 68, to determine the proper exposure time.

Figure 2A:
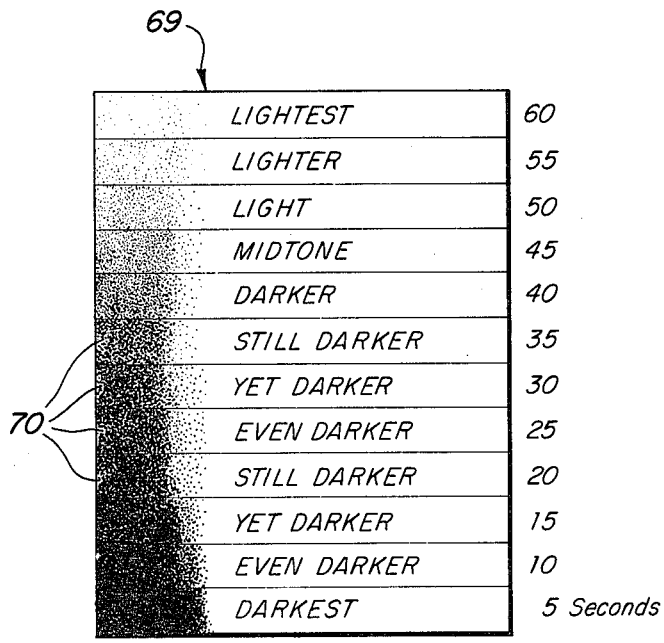
FIG. 2A is an illustration of a stepped exposure made on a piece of 8×10 photographic paper by the method of FIG. 2.

The stepped exposure print on paper 69 produced by the method of FIG. 2 is shown in FIG. 2a as consisting of twelve strips or areas of varying degrees of gray, or some shade of gray, made from a positive transparency or slide, as per step 56, FIG. 2. The darkest or least exposed strip is exposed for five seconds, and each subsequent lighter strip is exposed for five seconds more. The strip closest to mid-tone gray is indicated as exposed for 45 seconds, so that in this example the proper exposure time is 45 seconds.

Alternatively, if step 58 was performed, this color pack and this exposure time is proper for all paper identified as having this emulsion code, i.e. having the similar D/log E characteristics, when used with any negative film having the same D/log E characteristics as originally used, i.e. having the same emulsion. If the steps contain a color cast making it difficult to determine which step is closest to midtone, then color filters similar to the cast may be composed over both the gray reference, e.g. an 18% gray card, and the steps in order to minimize the effect of the color difference on the determination.

In referring to processing prints throughout this application, all types of processing are included; that is, prints exposed by means of this method are processed with traditional wet-processing techniques using three, four, five, and even more processing steps. More recently developed wet processing techniques, such as Unicolor and Beseler, using only one or two wet processing steps, are also used very effectively, and the method works extremely well with Polaroid film, which requires no conventional wet processing steps: the processing in the case of Polaroid film merely involves pulling the exposed film to actuate the sixty-second printing process without the use of any wet processing.

The intensity required to obtain proper exposure with the now-determined exposure time may be determined by removing the image of the gray card, step 71, FIG. 8, and measuring the light at the print plane 20 on the easel 22 with a meter 26, step 72. Once determined this intensity, however measured or calibrated as indicated by meter 26, is the intensity that must be present on the print plane to obtain the proper exposure, regardless of any variations in magnification.

With the exposure time and intensity now determined, the necessary color filtration is determined in accordance with the steps illustrated in FIG. 9, where like steps have been given like numbers with respect to FIG. 2. In order to start closer to the proper color pack, complementary color filtration necessary to neutralize any color cast of the steps, FIG. 2A, is determined and that filtration is combined with any already in the enlarger head such as that suggested by the paper manufacturer. In positive printing the filtration is added; in negative it is subtracted. Then the enlarger is set at a desired magnification, for example 8×10, step 50; and then the intensity at the easel is set to that previously measured in FIG. 8, step 73. Assuming once again that we are working with positive images, we insert the slide of the gray card in the film holder, step 56, and place an 8×10 sheet of paper on the easel, step 60.

Figure 7:
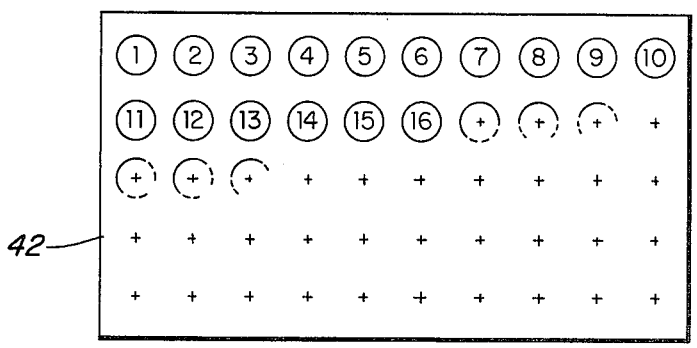
FIG. 7 depicts a portion of a typical commercially available filter calculator device for darkroom use.

Preferably, a color filter calculator device 42, FIG. 7, is used, which is now placed on the paper, step 74, and exposed for the required time as determined from the gray steps of FIG. 2, step 75. The print is processed, step 66, and the one of the gray areas or spots formed by the calculator device on the paper which is closest in color to a gray reference card is selected and the filtration is determined therefrom, step 76. Intensity adjustment may be necessary when using certain color calculator devices to obtain the required intensity level at the print plane. For example, the measured intensity is increased by about two stops when using a Mitchell Duo-cube to compensate for approximately two stops of neutral density.

The color filtration so determined is now added to whatever filter pack may already be in the enlarger. For all future prints made on the same batch of paper or paper having the same emulsion number or D/log E characteristics, the same filtration pack and exposure time and intensity is used for all film frames having the same D/log E characteristics; that is, if step 56 was performed using a positive film, then this color pack and exposure time is proper for all frames of all positive film.

The printing of any frame on any similar film as previously defined may be performed on any similar paper as herein defined by inserting the required color filtration in the light source, step 80, FIG. 10, placing the film to be printed in the film holder, step 82, setting magnification of the enlarger, step 84, removing the film, step 86, and adjusting the lens of the enlarger, step 88, to obtain the same intensity on the print plane 20, on easel 22, as measured above in step 72. The lens 18, holder 16, filter 14, and light source 12 of enlarger 10, FIG. 1, may be moved to any position vertically above print plane 20 to obtain whatever magnification is desired. However, the desired results will obtain so long as the intensity at the print plane 20, as indicated in step 88, is maintained at the same intensity as measured in step 72.

Subsequently the film is replaced, step 90, a sheet of photographic paper having similar characteristics is exposed at the print plane, step 92, and then processed, step 94, to obtain a print.

Other embodiments will occur to those skilled in the art and are within the following claims:

What is claimed is:

1. A method of photographic printing comprising:
   making a stepped exposure of a simulation of a properly exposed gray card for a film to be printed having particular D/log E characteristics, and a film-mask-colored element for film having a colored mask, for a number of different periods of time on at least one sheet of photographic paper having certain D/log E characteristics;
   processing each sheet of paper;
   comparing each such exposure step of said simulation of a properly exposed gray card to a gray reference to determine the proper exposure time from the step most closely approaching the gray reference; and
   measuring the intensity of the exposing light to obtain the proper intensity which, with the proper time, determines the exposure to be used to print all films having D/log E characteristics generally similar to said particular D/log E characteristics on paper having D/log E characteristics generally similar to said certain D/log E characteristics.

2. The method of claim 1 further including:
   making an additional exposure of a simulation of the properly exposed neutral gray card for a film to be printed having said particular D/log E characteristics, and a film-mask-colored element for film having a colored mask, for said proper time at said proper intensity on at least one sheet of photographic paper having said certain D/log E characteristics;
   processing each sheet of paper; and
   comparing said additional exposure of said simulation of a gray card to a gray reference to determine the color filtration to be used to print all films having D/log E characteristics generally similar to said particular D/log E characteristics on paper having D/log E characteristics generally similar to said certain D/log E characteristics.

3. The method of claim 2 in which said gray reference is midtone and neutral.

4. The method of claim 2 in which said additional exposure is made through a color filter calculator device.

5. The method of claim 1 in which said gray reference is midtone.

6. The method of claim 1 in which said comparing of each such exposure step includes imposing on said gray reference and exposure steps filtration similar in color to any color cast of said exposure steps to minimize the effect of any color difference between said gray reference and exposure steps during comparison.

7. The method of claim 1 further including imposing on said exposure steps filtration complementary in color to any color cast of said exposure steps to neutralize any color difference between said exposure steps and gray reference to determine the approximate color filtration to be used.

8. A method of photographic printing comprising:
making a stepped exposure of a simulation of a properly exposed gray card for a film to be printed having particular D/log E characteristics, and a film-mask-colored element for film having a colored mask, for a number of different periods of time on at least one sheet of photographic paper having certain D/log E characteristics;
processing each sheet of paper;
comparing each such exposure step of said simulation of a properly exposed gray card to a gray reference to determine the proper exposure time from the step most closely approaching the gray reference;
measuring the intensity of the exposing light to obtain the proper intensity which, with the proper time, determines the exposure to be used to print all films having D/log E characteristics generally similar to said particular D/log E characteristics on paper having D/log E characteristics generally similar to said certain D/log E characteristics;
making an additional exposure of a simulation of a properly exposed neutral gray card for a film to be printed having said particular D/log E characteristics, and a film-mask-colored element for film having a colored mask, for said proper time at said proper intensity on at least one sheet of photographic paper having said certain D/log E characteristics;
processing each sheet of paper; and
comparing said additional exposure of said simulation of a gray card to a gray reference to determine the color filtration to be used to print all films having D/log E characteristics on paper having D/log E characteristics generally similar to said certain D/log E characteristics.

* * * * *